(12) United States Patent
Incorvia et al.

(10) Patent No.: US 6,530,982 B1
(45) Date of Patent: Mar. 11, 2003

(54) SELF-RETAINING ABSORBENT UNIT

(75) Inventors: Samuel A. Incorvia, North Tonawanda, NY (US); Peter R. Millen, Warsaw, NY (US); Leo J. Schwartz, Tonawanda, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 10/047,651

(22) Filed: Jan. 15, 2002

(51) Int. Cl.[7] .......................... F25B 43/00; B01D 53/04
(52) U.S. Cl. ................... 96/147; 55/515; 210/282; 62/474; 62/503
(58) Field of Search .............. 62/474, 503; 206/204; 210/282, 484; 96/147, 135, 136; 55/512, 513, 515

(56) References Cited

U.S. PATENT DOCUMENTS

| | | | |
|---|---|---|---|
| 4,116,649 A | 9/1978 | Cullen et al. | |
| 4,401,447 A | 8/1983 | Huber | |
| 4,405,347 A | 9/1983 | Cullen et al. | |
| 4,911,739 A * | 3/1990 | Cullen et al. | 96/133 |
| 4,994,185 A * | 2/1991 | Cullen et al. | 210/282 |
| 5,636,525 A | 6/1997 | Riemenschneider | |
| 6,155,072 A * | 12/2000 | Sullivan et al. | 62/474 |
| 6,170,288 B1 | 1/2001 | Incorvia | |
| 6,209,347 B1 | 4/2001 | Corrigan et al. | |
| 6,279,341 B1 | 8/2001 | Incorvia et al. | |
| 6,345,516 B1 * | 2/2002 | Kesler et al. | 62/503 |
| 6,427,477 B2 * | 8/2002 | Incorvia et al. | 62/474 |

* cited by examiner

Primary Examiner—David A. Simmons
Assistant Examiner—Frank M. Lawrence
(74) Attorney, Agent, or Firm—Joseph P. Gastel

(57) ABSTRACT

An adsorbent unit including first and second porous containers, adsorbent in the first and second porous containers, a first and second end on each of the first and second containers, a yoke connecting the first ends, spaced first apertures in the yoke, a severance in the yoke extending between and in communication with the first apertures, a tab on each of the second ends of the first and second porous containers, and a second aperture in each of the tabs.

28 Claims, 4 Drawing Sheets

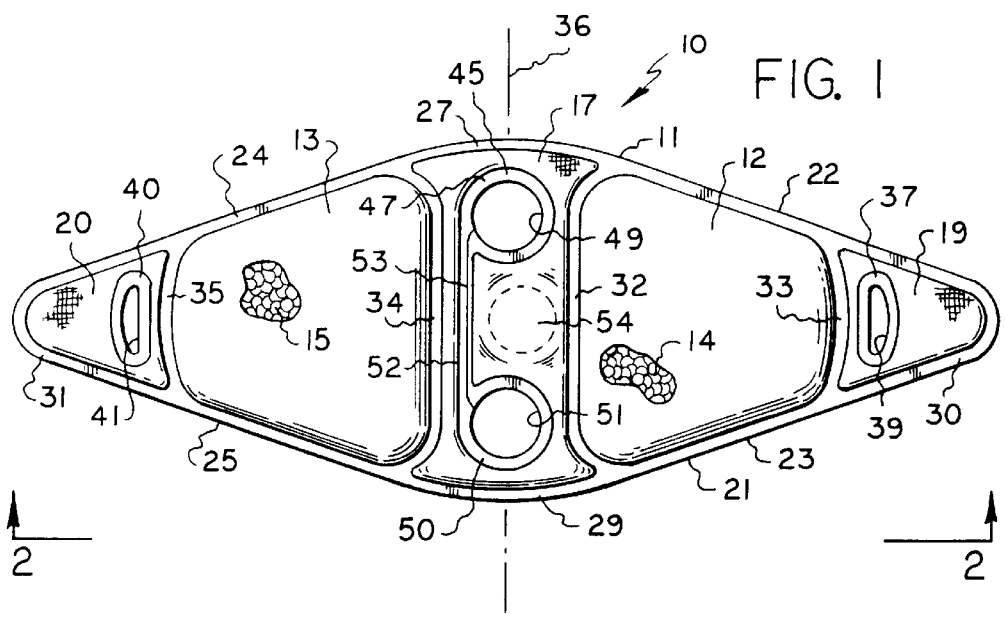
FIG. 1
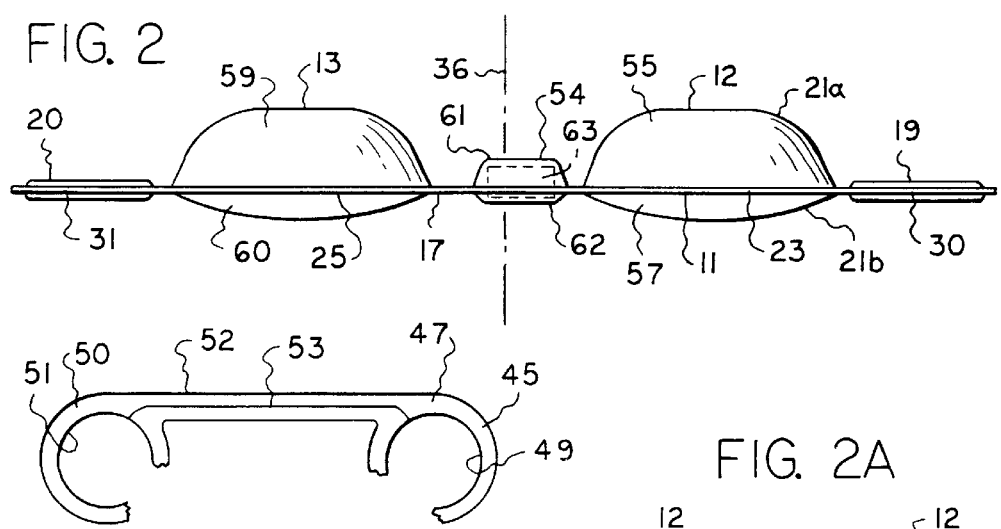
FIG. 2
FIG. 1A
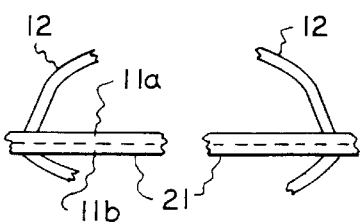
FIG. 2A

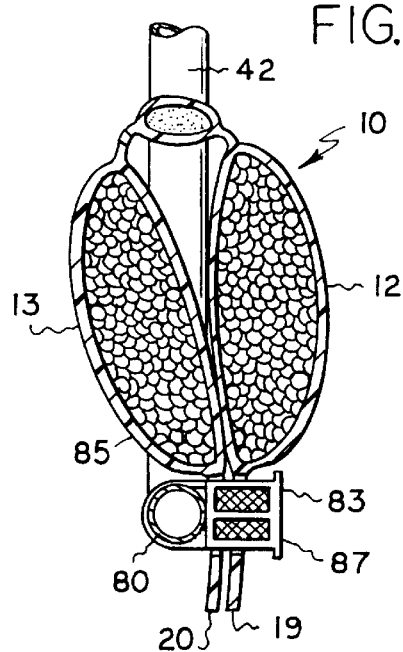
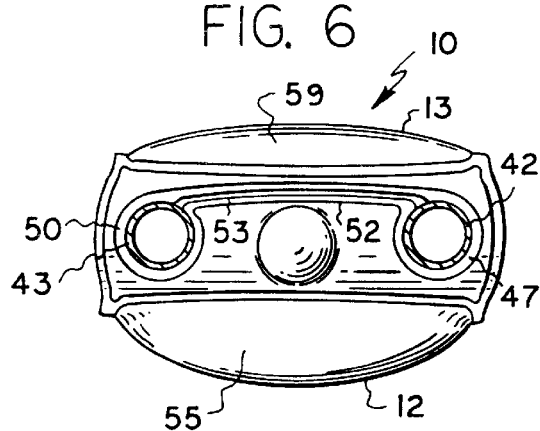
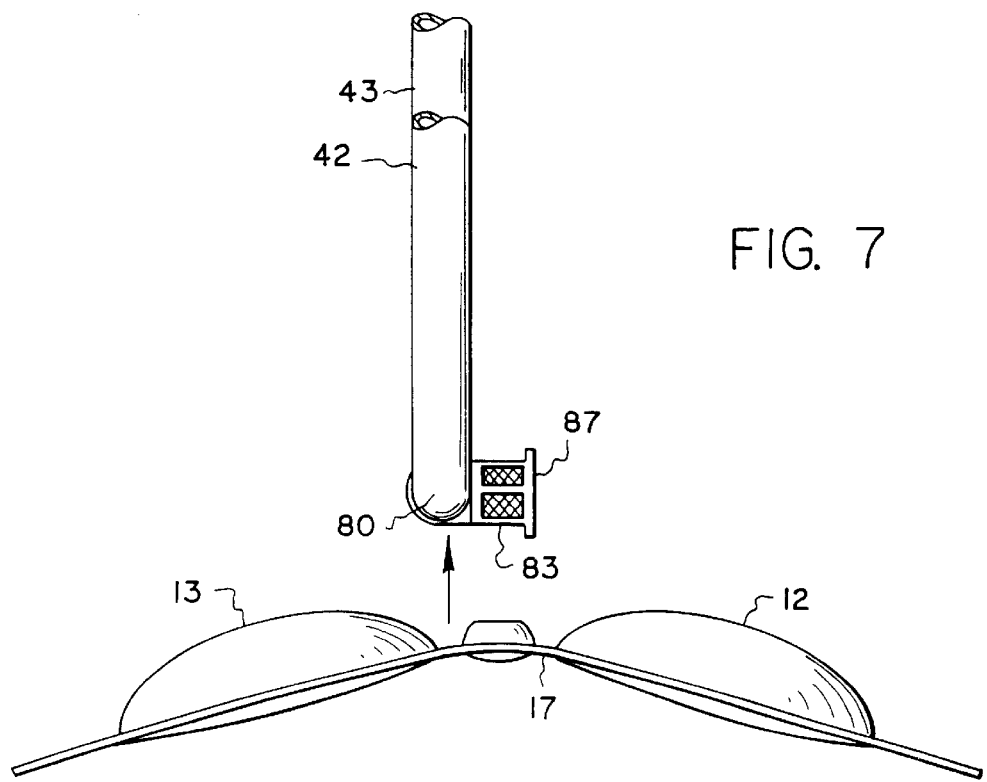

SELF-RETAINING ABSORBENT UNIT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved adsorbent unit for use in a refrigerant accumulator which contains a U-bend pipe and which is used in an automotive air conditioning system.

By way of background, saddle-type of adsorbent units and other types of adsorbent units have been secured to U-bend pipes in various manners. However, there was generally a certain amount of looseness between the yoke of the adsorbent unit and the spaced pipe portions of the U-bend pipe.

BRIEF SUMMARY OF THE INVENTION

It is the object of the present invention to provide an improved saddle-type adsorbent unit which provides a fit with spaced pipe portions of a U-bend pipe so that the yoke is not distorted thereby lessening stress points thereon, and also lessening the abrasion to which the yoke is subjected due to vibration of the accumulator in which it is located. Other objects and attendant advantages of the present invention will readily be perceived hereafter.

The present invention relates to an adsorbent unit comprising first and second porous containers, adsorbent in said first and second porous containers, a first and second end on each of said first and second porous containers, a yoke connecting said first ends, spaced first apertures in said yoke, a severance in said yoke extending between and in communication with said first apertures, a tab on each of said second ends of said first and second porous containers, and a second aperture in each of said second tabs.

The present invention also relates to a refrigerant accumulator having a housing with a bottom wall and a side wall and a U-shaped pipe with a return bend proximate said bottom wall and with first and second pipe portions extending from said return bend along said side wall, and a filter body extending outwardly from said return bend, the improvement of an adsorbent unit comprising first and second porous containers, adsorbent in said first and second porous containers, a first and second end on each of said first and second porous containers, a yoke connecting said first ends, spaced first apertures in said yoke receiving said first and second pipe portions, a severance in said yoke extending between and in communication with said first apertures, a tab on each of said second ends of said first and second containers, and second apertures on each of said tabs receiving said filter body.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a partially broken away plan view of the adsorbent unit of the present invention;

FIG. 1A is an enlarged fragmentary portion of FIG. 1;

FIG. 2 is a side elevational view taken substantially in the direction of arrows 2—2 of FIG. 1;

FIG. 2A is an enlarged fragmentary portion of FIG. 2;

FIG. 5 is a fragmentary cross sectional view taken substantially along line 5—5 of FIG. 4;

FIG. 6 is a cross sectional view taken substantially along line 6—6 of FIG. 4;

FIG. 7 is a fragmentary schematic view taken substantially in the direction of arrows 7—7 of FIG. 4 showing the first step of mounting the adsorbent unit of FIG. 1 onto the U-shaped pipe of FIG. 4;

DETAILED DESCRIPTION OF THE INVENTION

Figures 3, 4:
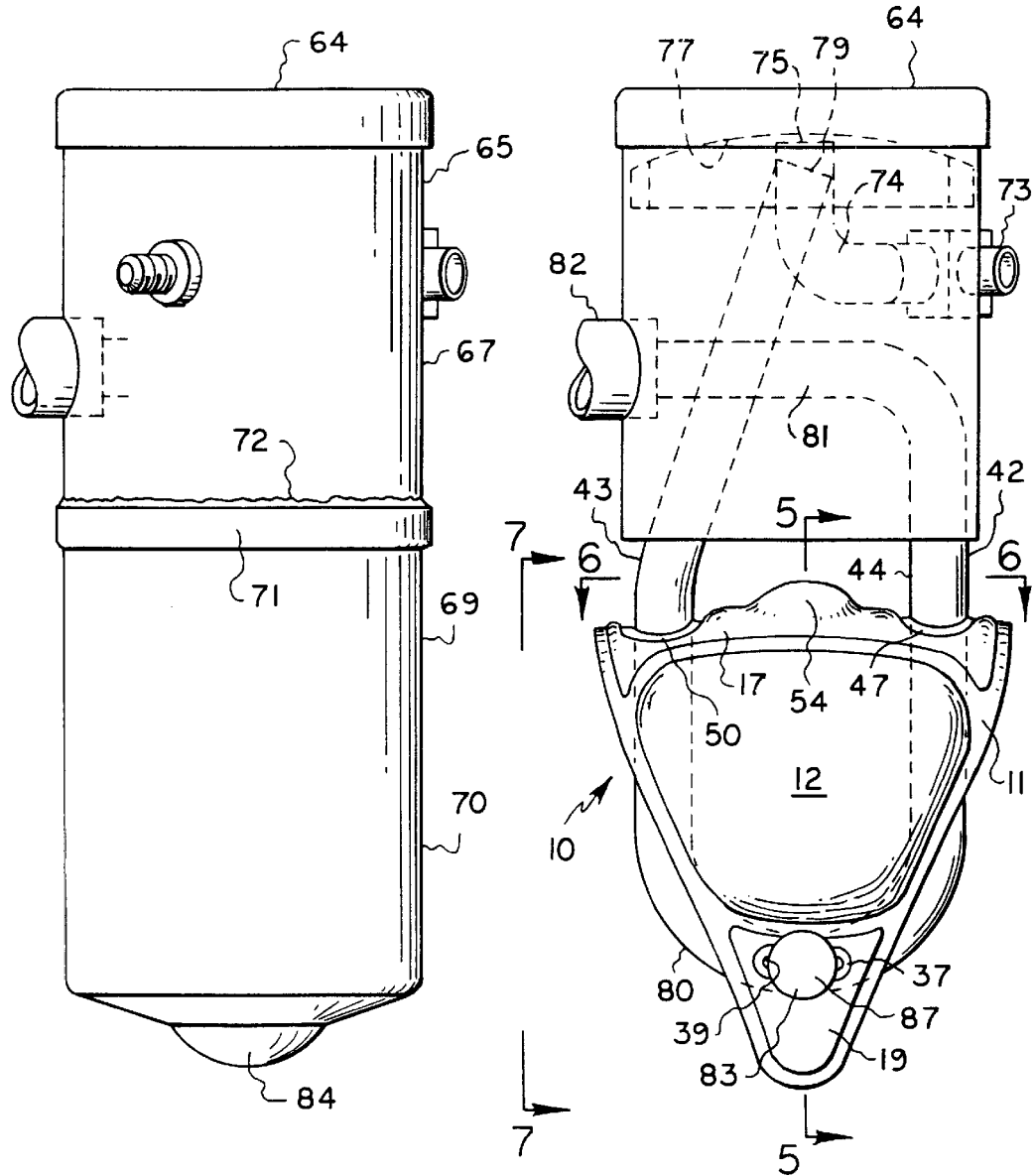
FIG. 3 is a side elevational view of an accumulator type of receiver in which the adsorbent unit of FIG. 1 is mounted.
FIG. 4 is a side elevational view of the accumulator of FIG. 4 with the bottom portion removed and the adsorbent unit of the present invention mounted relative to the U-bend pipe therein.
Figure 8:
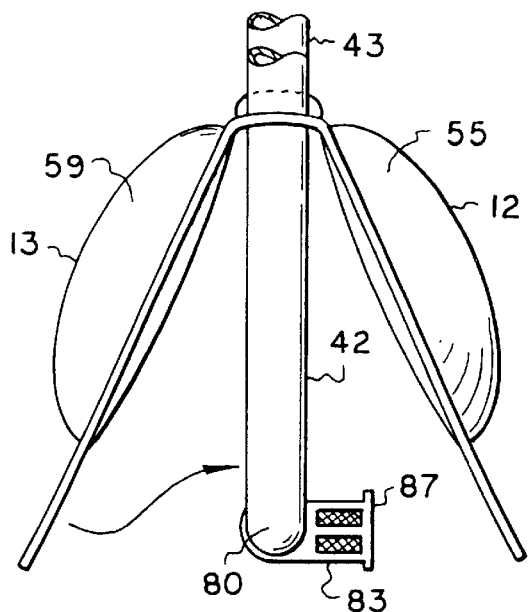
FIG. 8 is a fragmentary side elevational view showing the yoke of the adsorbent unit mounted on the spaced pipe portions of the U-shaped pipe.

The adsorbent unit 10 of the present invention includes a casing 11 formed of porous material, in this instance, heat-fusible felted polyester, but it may be fabricated of any other suitable material. Casing 11 is formed from two sides 11a and 11b (FIG. 2A) of felted polyester which are bonded to each other by fused seams and it comprises two adsorbent containers 12 and 13 each containing adsorbent 14 and 15, respectively. The containers 12 and 13 are secured to each other by a yoke 17. A tab 19 extends outwardly from container 12, and a tab 20 extends outwardly from container 13. The preferred adsorbent is molecular sieve but any other suitable adsorbent may be used.

The adsorbent unit 10 is defined by a fused seam 21 which extends about the entire casing 11. Fused seam 21 includes portions 22 and 23 on the sides of container 12 and portions 24 and 25 on the sides of container 13. Portion 27 of fused seam 21 connects portions 22 and 24, and portion 29 of fused seam 29 connects portions 23 and 25. Portion 30 of fused seam 21 defines the outer border of tab 19 and joins fused seam portions 22 and 23. Portion 31 of fused seam 21 defines the periphery of tab 20 and joins fused seam portions 24 and 25. Fused seam 32 defines a border of container 12 and its ends merge into portions 22 and 23 of fused seam 21. Fused seam 33 defines a common border of container 12 and tab 19, and it joins fused seam portions 22 and 23. Fused seam 34 defines the common border between container 13 and yoke 17, and its ends join fused seam portions 24 and 25. Fused seam 35 defines the common border of container 13 and tab 20 and it joins portions 24 and 25 of fused seam 21. A fused seam 37 in tab 19 defines an aperture 39. A fused seam 40 in tab 31 defines an aperture 41. All of the fused seams join the two sides 11a and 11b of the casing 11.

As can be seen from FIG. 1, containers 12 and 13 are of substantially trapezoidal shape, and tabs 19 and 20 are of substantially triangular shape. When container 12 and tab 19 are considered in combination, they approximate a triangular shape in plan. When container 13 and tab 20 are considered in combination, they also approximate a triangular shape in plan. The casing 11 is substantially symmetrical about centerline 36. Also, the ends of containers 12 and 13 at 32 and 34, respectively, are wider than the ends at 33 and 35, respectively, in accordance with their trapezoidal shapes.

Yoke 17 is of a construction so that it fits onto spaced pipe portions 42 and 43 of U-shaped pipe 44 (FIG. 4). In this respect yoke 17 includes a fused seam 45 which includes a circular seam portion 47 which defines an aperture 49, and it includes a circular seam portion 50 which defines an aperture 51. Fused seam portions 47 and 50 are connected by a fused seam portion 52 having a severance 53 therein in the form of a slit which is in communication with apertures 49 and 51. While the severance is shown as a slit which is in the form of a line, it will be appreciated that the severance can take the form of a narrow slot.

A chamber 54 is formed in yoke 17 by a deformation side 11a of the casing 11. The side 11b merely bulges out. Container 12 includes a pronounced convex side 55 on side 11a and a less pronounced convex side 57 on side 11b. Container 13 includes a pronounced convex side 59 on side 11a and a less pronounced convex side 60 on side 11b. The compartment 54 includes a pronounced concave side 61 and a less pronounced concave side 62. A refrigerant dye tracer tablet 63 or a granular refrigerant tracer composition is contained within compartment 54.

The adsorbent unit 10 is intended to be mounted in a prior art accumulator-type of receiver 64 (FIGS. 3 and 4) which includes an upper cylindrical housing portion 65 having a cylindrical side wall 67 and a lower cylindrical housing portion 69 having a cylindrical side wall 70 and an annular flange 71 which receives the lower edge portion of side wall 67 with an interference fit, and a joint is thereafter hermetically welded at 72. Insofar as pertinent here, the accumulator 64 includes a pipe 73 which receives a mix of liquid and gas refrigerant which is conducted through pipe 74 to an outlet 75 proximate a concave portion 77 onto which the mix impinges and enters the inside of the accumulator. The upper end 79 of U-shaped pipe 44 is open, and it receives the gaseous refrigerant which passes through pipe 43, return bend 80 and pipe 42 and pipe 81 to outlet 82 which leads to the compressor, as is well known in the art. The gaseous refrigerant passes through U-shaped pipe 44 because it rises to the top of accumulator 64 while the liquid refrigerant from the evaporator drops to the bottom of the accumulator. A lubricant inlet orifice (not shown) is located at U-bend 80. A filter housing 83 having a filter therein is in communication with the lubricant inlet orifice in the return bend 80 such that lubricant which accumulates in the bottom wall 84 (FIG. 3) is induced into the return bend and conveyed with the gaseous refrigerant to the compressor, as is well known in the art.

In FIGS. 4, 5 and 6, adsorbent unit 10 is shown in its installed position. In this respect, apertures 49 and 51 in yoke 17, which are surrounded by fused seam portions 47 and 50, respectively, receive pipe portions 42 and 43, respectively. As can be seen from FIGS. 4 and 6, the fused seam portions 47 and 50 surrounding apertures 49 and 51, respectively, make a good fit with pipe portions 42 and 43, respectively. Furthermore, the lower portion 85 (FIG. 5) of container 13 is threaded through the U-bend pipe between pipe portions 42 and 43. In addition, the tabs 19 and 20 receive filter housing 83 which is contained within apertures 39 and 41, respectively. The foregoing relationship between the adsorbent unit 10 and the U-shaped pipe 44 securely mounts the adsorbent unit onto the U-shaped pipe with a good fit.

In FIGS. 7–10 the procedure of mounting the adsorbent unit 10 onto the U-shaped pipe 44 is shown. The first step is to thread the bottom of the U-shaped pipe through slit 53 and apertures 40 and 51 in yoke 17 by passing the adsorbent unit 10 upwardly onto the U-bend pipe 42 from the position of FIG. 7 to the position shown in FIG. 8. Thereafter the container 13 is threaded through the space between pipe portions 42 and 43 to the position shown in FIG. 9, and thereafter tab 20 is mounted on filter housing 83. The last step of the mounting procedure is to mount tab 19 onto filter housing 83. The end of filter housing 83 is in the shape of a disc 87 which is larger than the diameter of the cylindrical housing 83, and this acts as a stop which prevents the tabs 19 and 20 from moving off of housing 83.

The threading of container 13 through the space between pipe portions 42 and 43 is facilitated because of the trapezoidal shape of container 13 and the triangular shape of tab 20 with the apex of tab 20 providing a point. Also, since the casing 11 is substantially symmetrical about centerline 36 either container 12 or 13 can be the one which is threaded through the space between the pipe portions 42 and 43, depending on the initial orientation of the adsorbent unit 10 relative to the U-bend pipe. By virtue of the fit between the circular seams 47 and 50 with pipe portions 42 and 43, respectively, there are practically no distortion-producing stress points on yoke 17 when the adsorbent unit is in its fully installed position, especially considering that the fused seam portion 52 returns substantially to the positions of FIGS. 1 and 1A. In addition, the fit of apertures 49 and 50 with pipe portions 42 and 43, respectively, tends to lessen abrasion of the yoke 17 which would occur when the accumulator is vibrated during the movement of the vehicle in which it is located, especially considering that the pipe portions 42 and 43 are engaged by the hardened fused seams 49 and 50, respectively.

Figure 11:
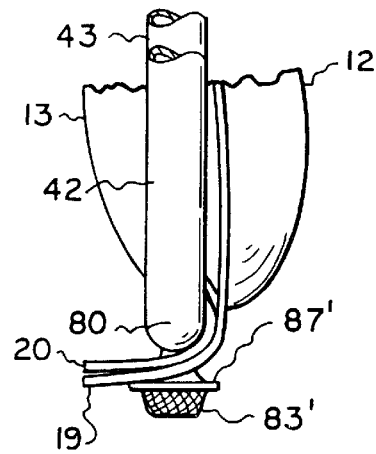
FIG. 11 is a fragmentary side elevational view of the adsorbent container of the present invention mounted on a U-shaped pipe wherein the filter housing is mounted in a different manner than in the preceding figures.
Figure 10:
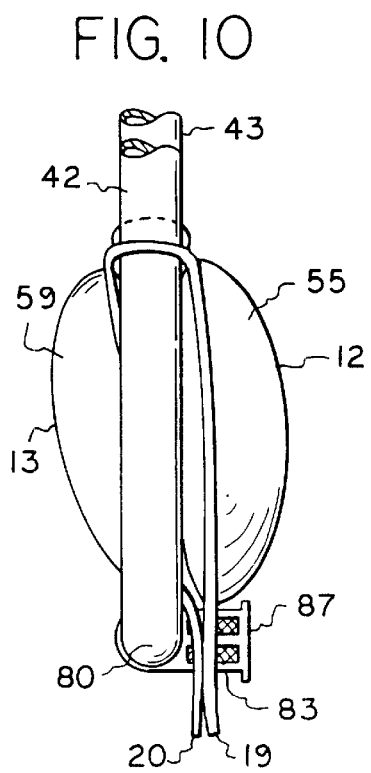
FIG. 10 is a fragmentary side elevational view showing the adsorbent unit of FIG. 1 fully mounted on the U-shaped pipe.
Figure 9:
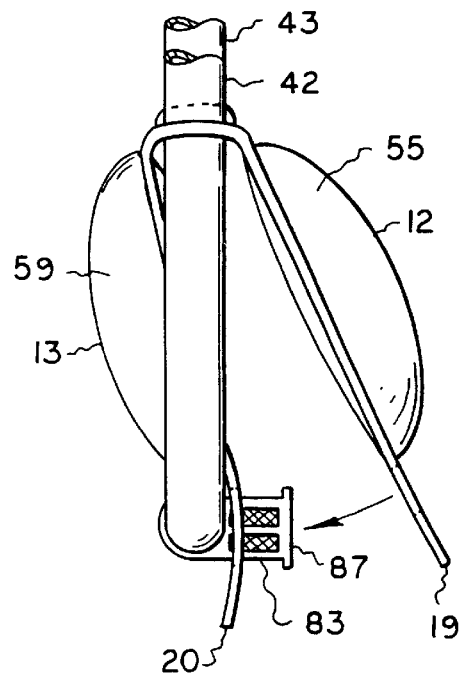
FIG. 9 is a fragmentary side elevational view showing one adsorbent container threaded through the spaced pipe portions of the U-shaped pipe.

In FIG. 11 the adsorbent unit 11 is shown mounted on a U-shaped pipe which is identical in all respects to that shown in the preceding figures except that the filter housing 83' extends downwardly from U-bend 80 and its disc 87' is located as shown. The tabs 19 and 20 are mounted on filter housing 87' between disc 83' and the undersurface of U-bend 80, and that portion of the filter housing is received in apertures 39 and 41 of tabs 19 and 20, respectively.

While the apertures 49 and 50 have been shown in their preferred circular configuration, it will be appreciated that they can be of other configurations which will receive pipe portions 42 and 43 without creating appreciable distortion of yoke 17.

While a preferred embodiment of the present invention is shown, it will be appreciated that it is not limited thereto but may be otherwise embodied within the scope of the following claims.

What is claimed is:

1. An adsorbent unit comprising first and second porous containers, adsorbent in said first and second porous containers, a first and second end on each of said first and second porous containers, a yoke connecting said first ends, spaced first apertures in said yoke, a severance in said yoke extending between and in communication with said first apertures, a tab on each of said second ends of said first and second porous containers, and a second aperture in each of said tabs.

2. An adsorbent unit as set forth in claim 1 wherein each of said first ends of said first and second containers are wider than said second ends.

3. An adsorbent unit as set forth in claim 2 wherein said first and second containers are of substantially trapezoidal shape.

4. An adsorbent unit as set forth in claim 3 wherein said first container in combination with said first tab is substantially in the shape of a triangle.

5. An adsorbent unit as set forth in claim 4 wherein said second container in combination with said second tab is substantially in the shape of a triangle.

6. An adsorbent unit as set forth in claim 1 including a chamber in said yoke.

7. An adsorbent unit as set forth in claim 6 wherein said chamber is positioned between said spaced first apertures.

8. An adsorbent unit as set forth in claim 7 wherein said chamber is located next to said severance.

9. An adsorbent unit as set forth in claim 1 wherein said adsorbent unit comprises fusible material, and wherein said severance is in a fused seam in said fusible material.

10. An adsorbent unit as set forth in claim 9 wherein said apertures are of substantially circular shape.

11. An adsorbent unit as set forth in claim 9 wherein said apertures are within second fused seams.

12. An adsorbent unit as set forth in claim 1 wherein said apertures are within fused seams.

13. An adsorbent unit as set forth in claim 6 including a refrigerant tracer dye tablet in said chamber.

14. An adsorbent unit as set forth in claim 6 including a granular refrigerant tracer dye composition in said chamber.

15. In a refrigerant accumulator having a housing with a bottom wall and a side wall and a U-shaped pipe with a return bend proximate said bottom wall and with first and second pipe portions extending from said return bend along said side wall, and a filter body extending outwardly from said return bend, the improvement of an adsorbent unit comprising first and second porous containers, adsorbent in said first and second porous containers, a first and second end on each of said first and second porous containers, a yoke connecting said first ends, spaced first apertures in said yoke receiving said first and second pipe portions, a severance in said yoke extending between and in communication with said first apertures, a tab on each of said second ends of said first and second containers, and second apertures in each of said tabs receiving said filter body.

16. In a refrigerant accumulator as set forth in claim 15 wherein each of said first ends of said first and second containers are wider than said second ends.

17. In a refrigerant accumulator as set forth in claim 16 wherein said first and second containers are of substantially trapezoidal shape.

18. In a refrigerant accumulator as set forth in claim 17 wherein said first container in combination with said first tab is substantially in the shape of a triangle.

19. In a refrigerant accumulator as set forth in claim 18 wherein said second container in combination with said second tab is substantially in the shape of a triangle.

20. In a refrigerant accumulator as set forth in claim 15 wherein said severance is in the form of a slit.

21. In a refrigerant accumulator as set forth in claim 15 wherein said first container includes a portion proximate said first tab which is positioned between said first and second pipe portions.

22. In a refrigerant accumulator as set forth in claim 21 wherein said first and second tabs are positioned in side-by-side relationship on said filter body.

23. In a refrigerant accumulator as set forth in claim 15 wherein said adsorbent unit comprises fusible material, and wherein said severance is in a fused seam in said fusible material.

24. In a refrigerant accumulator as set forth in claim 23 wherein said apertures are of substantially circular shape.

25. In a refrigerant accumulator as set forth in claim 23 wherein said apertures are within second fused seams.

26. In a refrigerant accumulator as set forth in claim 15 wherein said apertures are within fused seams.

27. In a refrigerant accumulator as set forth in claim 15 including a chamber in said yoke, and a refrigerant tracer dye tablet in said chamber.

28. In a refrigerant accumulator as set forth in claim 15 including a chamber in said yoke, and a granular refrigerant tracer composition in said chamber.

\* \* \* \* \*

UNITED STATES PATENT AND TRADEMARK OFFICE
CERTIFICATE OF CORRECTION

PATENT NO.     : 6,530,982 B1
DATED          : March 11, 2003
INVENTOR(S)    : Samuel A. Incorvia et al.

It is certified that error appears in the above-identified patent and that said Letters Patent is hereby corrected as shown below:

Column 1,
Line 42, before "tabs" delete "second".

Signed and Sealed this

Twenty-second Day of April, 2003

JAMES E. ROGAN
*Director of the United States Patent and Trademark Office*